United States Patent

Duttlinger

[11] 4,249,587
[45] Feb. 10, 1981

[54] BICYCLE TIRE WITH IMPROVED REINFORCING STRIP

[75] Inventor: Jean C. Duttlinger, Soissons, France

[73] Assignee: Wolber, Soissons, France

[21] Appl. No.: 12,899

[22] Filed: Feb. 16, 1979

Related U.S. Application Data

[63] Continuation-in-part of Ser. No. 785,295, Apr. 6, 1977, abandoned.

[30] Foreign Application Priority Data

Feb. 14, 1977 [FR] France .................. 77 04080

[51] Int. Cl.³ ............................................. B60C 9/18
[52] U.S. Cl. ......................... 152/354 R; 152/361 R
[58] Field of Search .......... 152/354, 355, 357, 361 R, 152/361 FP, 361 DM; 66/169, 170, 202

[56] References Cited

U.S. PATENT DOCUMENTS

| | | | |
|---|---|---|---|
| 524,105 | 8/1894 | Doughty | 152/354 X |
| 1,199,264 | 9/1916 | Grabau | 152/354 |
| 1,228,650 | 6/1917 | Christian | 152/361 R X |
| 3,424,220 | 1/1969 | Schuerch | 66/202 X |
| 3,738,408 | 6/1973 | Rach et al. | 152/361 FP |
| 3,921,690 | 11/1975 | Edwards | 152/354 |

FOREIGN PATENT DOCUMENTS

| | | | |
|---|---|---|---|
| 1047043 | 12/1958 | Fed. Rep. of Germany | 152/361 FP |
| 2229790 | 1/1974 | Fed. Rep. of Germany | 152/361 FP |

*Primary Examiner*—Randolph A. Reese
*Assistant Examiner*—D. W. Underwood
*Attorney, Agent, or Firm*—Wenderoth, Lind & Ponack

[57] ABSTRACT

A bicycle tire, notably tubular tire, includes a flexible reinforcing structure added to the tread, the reinforcing structure consisting of high tensile strength yarns assembled beforehand in the form of a knitted sheath or tubular member, and intimately bonded to the rubber by causing the rubber to penetrate into the open meshes of the reinforcing structure during the tire vulcanization.

7 Claims, 3 Drawing Figures

BICYCLE TIRE WITH IMPROVED REINFORCING STRIP

This is a continuation-in-part of application Ser. No. 785,295, filed Apr. 6, 1977, now abandoned.

BACKGROUND OF THE INVENTION

The present invention relates to improvements in conventional and tubular bicycle tires and also to the method of manufacturing such tires.

It is known that racing cycle tires, also called tubular tires, comprise as a rule an inner tube enclosed in a textile casing or cover over which a cured rubber tread is superposed.

Since it is a constant concern in the manufacture of bicycle tires to minimize their rolling resistance and inertia, extremely lightweight tubular tires have been developed which comprise a generally thin outer peripheral tread. Thus, tubular tires of very reduced diameter are produced, but the smaller this diameter or cross-sectional dimension, the higher the inflation pressure. As a result, puncture hazards increase considerably, and this constitutes a major inconvenience for racers.

The recent trend among an increasing number of cyclists for adopting tubular tires instead of conventional tires is attended by the same inconveniences as those known to racers, not so much on the road since the ordinary cyclist is in less of a hurry than racers, but at home where tubular tire repair constitutes a tedious and time-consuming operation.

All these inconveniences have led to various attempts to find some means capable of limiting the penetration through the tread of foreign, pointed bodies such as are currently found on road surfaces, for example flints, glass splinters, nails, glass or metal fragments, etc. Such means consisted mainly in interposing a reinforcing element in the tread structure for preventing such penetration, this element consisting in general of tightly woven cotton fabric. However, notwithstanding the superposition of two or more fabric layers for constituting the reinforcing element, the desired result is attained only partly.

This prior art solution was improved notably by replacing cotton with stronger textile materials, such as polyamids ("Nylon"), or polyesters ("Tergal") already widely used in the tire industry.

SUMMARY OF THE INVENTION

The present invention is directed to obtaining further improvements in tubular tires or even conventional tires for bicycles or the like, of the type comprising a tread and protected against the penetration of pointed bodies as mentioned hereinabove.

Therefore, the present invention is concerned with improved conventional tires and tubular tires for bicycles, characterized in that the improvement consists in incorporating in, or adding to, the tread a flexible reinforcing structure obtained by utilizing yarns of relatively high tensile strength, notably fine-gage flexible steel wires, or aromatic polyamid yarns assembled beforehand in the form of a knitted sheath or tubular member, which is intimately bonded to the rubber penetrating into its open meshes during the vulcanization or curing operation.

BRIEF DESCRIPTION OF THE DRAWINGS

Other features and advantages of this invention will appear as the following description proceeds with reference to the accompanying drawings, wherein.

DETAILED DESCRIPTION OF THE INVENTION

Figure 1:
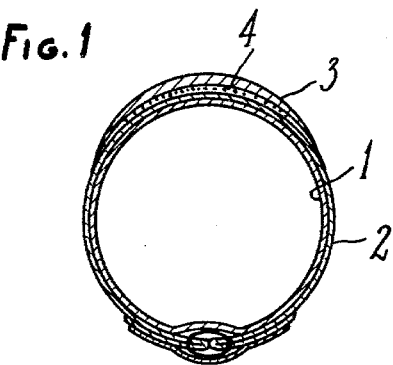
FIG. 1 illustrates diagrammatically in cross-section a typical embodiment of a tubular tire manufactured according to the teachings of the invention.

In the drawings, the inner tube 1 of a tubular tire is enclosed in a sewn casing 2 having a relatively thin tread 3. According to this invention, a reinforcing strip 4 is incorporated in the tread 3, this strip consisting of a flexible structure made of high tensile strength strands or yarns, such as aromatic polyamid yarns marketed under the registered Trade Name "Kevlar", or according to a preferred embodiment fine-gage flexible steel wire strands preferably assembled in the form of a knitted sheath or tubular member, intimately bonded to the rubber which, during the vulcanization, penetrates through the open mesh structure of the strip.

Figure 2:
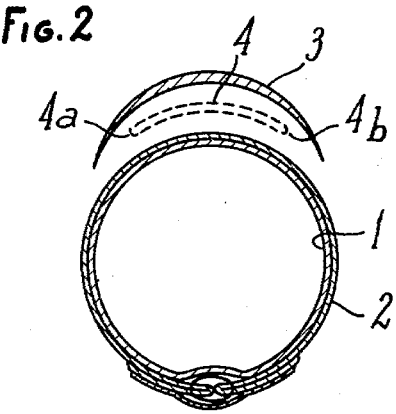
FIG. 2 is a view similar to FIG. 1, but shown exploded to illustrate the sheath-like or tubular configuration of the reinforcing structure.
Figure 3:
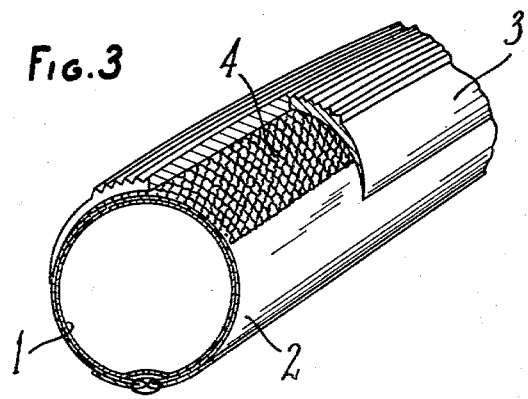
FIG. 3 is a perspective view, with portions cut away, of a tubular tire according to the invention.

More particularly, as shown in FIG. 2 of the drawings, the reinforcing strip 4 is in the form of a sheath or tubular member which extends circumferentially entirely around the casing 2. The sheath is knitted in a known tubular or seamless manner such that, as shown in FIG. 2, the cross-section of the sheath, including lateral edges 4a and 4b, is totally devoid of free wire ends.

This arrangement of the present invention provides several unique advantages. Specifically, the present invention enables fine-gage and high strength steel wire to be employed without the danger of there being free wire ends. Such free wire ends would easily puncture the casing 2 and inner tube 1, which when employed for bicycles are of relatively small size and thickness. If merely a single layer sheet of wire mesh were to be employed as the reinforcing strip, it is readily apparent that the opposite lateral edges of such strip would inherently possess free wire ends which would lead to puncture of the tire during use. Further, if a single layer sheet of wire mesh were to be employed as the reinforcing strip, experience has shown that the wires of such single layer sheet would break during use, thereby providing a further puncture hazard. Additionally, by employing the sheath or tubular member of the present invention, when the sheath or tubular member is flattened between the casing 2 and the tread 3, the result is a double layer or thickness of wire mesh, and this inherently provides increased resistance to puncture by external sources.

In a specifically preferred embodiment of the present invention the sheath or tubular member is knitted from strands, each of the strands being formed from three steel wires having a diameter of 60 microns. The steel wires are stainless steel, type AISI 304 L, cold-drawn with a strength of 110 kg/mm$^2$. It is specifically to be understood however that this type of wire is exemplary only and that the present invention is not intended to be limited thereto. Those of ordinary skill in the art will readily understand what other types, sizes and strengths of material may be employed to form a knitted sheath or tubular member in accordance with the present invention, dependent upon the particular tires, both conventional and tubular, employed.

Furthermore, the knitted sheath or tubular member has an open mesh which is sufficient to allow separation of the threads thereof, such that during penetration of the rubber from the casing and/or tread into the open meshes of the reinforcing structure, such rubber surrounds the individual threads of the knitted sheath or tubular member and isolates and separates such threads from each other. This prevents abrasion of the threads on each other during use of the tire.

According to this invention and as a function of the specific type of tubular or conventional tire contemplated, and also of the method of manufacturing the same, the reinforcing structure 4 may be bonded either directly to the casing 2 during the manufacture of the tire, or to the inner portion of the tread 3 before fitting the same to the casing 2. The reinforcing structure 4 may if desired be immersed beforehand into a rubber solution, or utilized without any preliminary treatment.

According to a modified embodiment of the present invention which is applicable to the manufacture of cemented tubular tires in which the tread is molded and cured separately, the reinforcing structure may be added to the tread before the vulcanization and the subsequent fitting thereof to the casing.

The reinforcing structure 4 may if desired be enclosed in sandwich fashion in the tread, between two identical or different rubber layers. The rubber compositions or mixtures suitable for the purposes of this invention may be selected among the various types of elastomers, and the structure of the other parts of the tubular or conventional tire may be conventional or different, for example the structure of a tubeless tire.

The presence of this reinforcing structure 4 safely prevents the penetration of pointed bodies encountered on the road surface, such as flints, nails and the like, into the inner tube 1, thus limiting considerably puncture hazards. Besides, due to its extremely reduced weight, this reinforcing structure will increase the weight and inertia of the tire only to a very limited and therefore negligible extent.

Of course, this invention should not be construed as being strictly limited by the specific embodiments described, illustrated or suggested herein, since many modifications may be made thereto by those conversant with the art, without departing from the basic principles of the invention as set forth in the appended claims. It is also to be pointed out that the invention is applicable not only to tubular tires but also to all conventional bicycle tires.

What I claim is:

1. A puncture resistant cycle tire comprising:
   a cycle tire casing having attached thereto a tread;
   a penetration resistant puncture preventing structure means positioned between said tread and casing, said puncture preventing structure means comprising a prefabricated assembly of high tensile strength threads in the form of an open mesh knitted sheath or tubular member, said sheath or tubular member having a transverse cross section, along a plane extending axially of said tire, in the form of a completely enclosed and endless configuration; and
   said tire being vulcanized such that rubber from at least one of said casing and said tread penetrates into the open meshes of said puncture preventing structure means, thereby intimately bonding said puncture preventing structure means to said rubber.

2. A bicycle tire as claimed in claim 1, wherein said casing is enclosed, and said tire is therefore a tubular tire.

3. A bicycle tire as claimed in claim 1, wherein rubber from both said casing and said tread penetrates into the open meshes of said puncture preventing structure means.

4. A bicycle tire as claimed in claim 1, wherein said knitted sheath or tubular member has an open mesh sufficient to allow separation of said threads thereof, and said rubber surrounds the individual said threads and isolates and separates said threads from each other.

5. A bicycle tire as claimed in claim 1, wherein said threads comprise fine-gage flexible steel wires.

6. A bicycle tire as claimed in claim 1, wherein said threads comprise strands, each said strand formed of three steel wires.

7. A bicycle tire as claimed in claim 1, wherein said threads comprise aromatic polyamid plastic yarns.

* * * * *